March 24, 1942.  J. B. WARNER  2,277,377
ABSORBING AGENT
Filed April 4, 1939
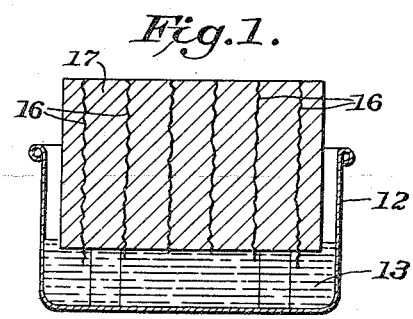
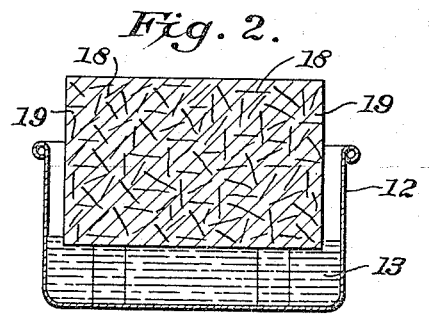
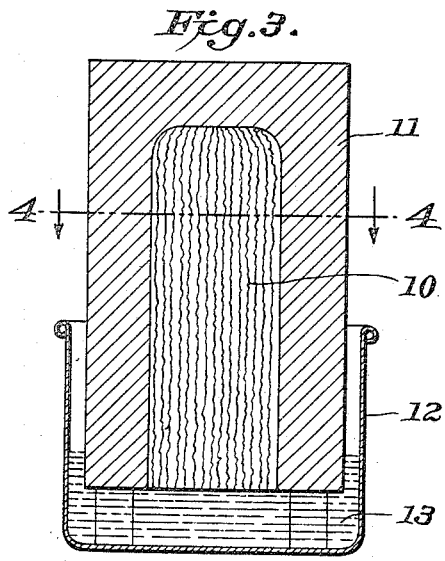
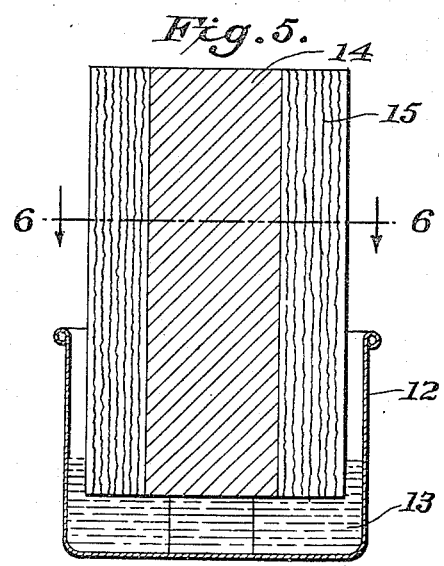
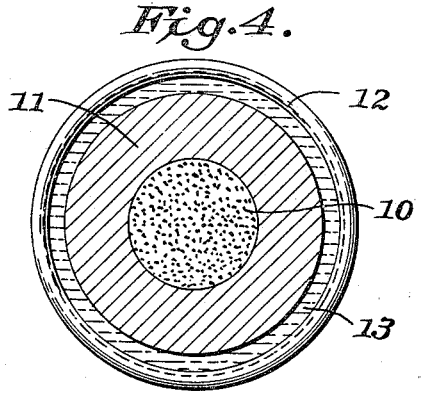
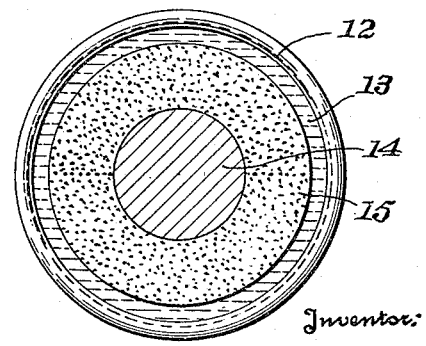
Inventor:
Joshua B. Warner, Patented Mar. 24, 1942

2,277,377

UNITED STATES PATENT OFFICE 2,277,377

ABSORBING AGENT

Joshua B. Warner, Chattanooga, Tenn.

Application April 4, 1939, Serial No. 265,971

6 Claims. (Cl. 299—20)

My invention relates to liquid absorbing and storing agents and more particularly to a combination of wood fiber or cellulose and a clay-like material such as bentonite which has the peculiar property of absorbing and/or absorbing large quantities of fluids such as water or gases, and gradually giving them off.

Bentonite is a clay-like substance composed substantially of montmorillonite while commonly known clays have as their chief constituent kaolinite, although the chemical analysis of bentonite approximates that of a typical clay, and its behavior generally is that of a fat heavy clay, it is one of the most finely divided naturally occurring substances known and presents a great surface area. Bentonite has a great affinity for water and certain other fluids, and after it has first been dispersed in water, the field of fluids absorbed is greatly broadened. Or it may be necessary to mix the liquid to be absorbed by bentonite with water in order to accomplish the dispersion of the bentonite. The affinity of bentonite for these liquids is so great that contact with them causes it to swell and this swelling is so pronounced along the surface of the body of the bentonite where water or other liquid has come into contact with it, that water or other liquids cannot further penetrate such surface and its absorption is, therefore, limited to the mere surface of the bentonite.

These qualities are well known and are pointed out in Collins Reissue No. 17,207, where it is proposed to take advantage of the swelling of bentonite by inserting it in concrete where it will swell and block the pores and crevices in the cement, thus providing an impervious shield.

Attempts have been made to conduct moisture or liquid into the bentonite by thin strands of wool and fibers of other materials but the swelling of the surface of the bentonite often chokes off the liquid moving along the surface of the strand or fiber and prevents ingress of the liquid beyond the surface or into the body.

Applicant, with a knowledge of all these objections to and defects in the prior art has, for the primary object of his invention, the provision of an absorbent structure including in combination a body or mass of absorbing material of the order of clay that swells when in contact with a liquid to an extent which retards the spreading of the liquid throughout the body or mass and a liquid conductor means which will convey the liquid through the interior of the body or mass, whereby a more complete saturation of the absorbing material may be had.

Applicant has, for another object of his invention, the provision of an article or product composed of cellulosic or other appropriate material mixed with or disposed within a block, sheath, cake or mass of bentonite for absorbing water or other liquids and giving it off gradually, by making use of the cooperating effect of the bentonite and the cellulosic material which will cause the liquid to flow through the cellulosic material at an accelerated speed and saturate the bentonite, penetrating the body as well as the surface of the block, shield or cake.

Applicant, has, as another object of his invention, the provision of a product or combination which will draw a liquid from a reservoir to a point higher than either of the constituents thereof acting alone, will store a greater volume of such liquid than either of the constituents acting alone and will give it off longer and more rapidly than any of the individual constituents.

Applicant has, as another object of his invention, the provision of a product of bentonite or other similar material and cotton or other similar material formed so that the surfaces of the cotton and bentonite are placed together and when water or other appropriate liquid is supplied, a cooperation between the cotton and bentonite results in raising, distributing and holding that liquid in a uniform dispersion, so that it will not drip, dribble or run away, but will gradually evaporate off into the atmosphere and draw further liquid from its source of supply, at the same time preventing that source from supplying more than is necessary to keep wet the surface presented to the atmosphere.

Applicant has, as another object of his invention, the provision of a product comprised of bentonite with cellulosic material dispersed therethrough for the distribution of moisture or liquid, the cellulosic material being of such character as to distribute the liquid therethrough, carrying it through the body of the cellulose rather than on the surface, thus overcoming the choking effect of the bentonite due to swelling.

Other objects and advantages of my invention will appear in the following specification and the novel features thereof will be particularly pointed out in the annexed claims.

In the drawing:

Figure 1 is a sectional view of an absorbent structure having continuous cellulosic fibres running throughout the body of the absorbing medium;

Figure 2 is a sectional view of an absorbent structure having short cellulosic fibres uniformly distributed throughout the body of the absorbing medium;

Figure 3 is a sectional view showing a body of an absorbing medium coating a body of cellulosic fibres to form a sheath therearound;

Figure 4 is a sectional view taken on line 4—4 of Figure 3;

Figure 5 is a sectional view showing a body of cellulosic fibres coating a body of an absorbing medium to form a sheath therearound, and Figure 6 is a sectional view taken on line 6—6 of Figure 5.

In carrying out my invention, I may select some cellulosic material such as cotton and roll it into the form of a wick 10 as shown in Figure 3 having the fiber running preferably lengthwise of the wick. The wick may next be wet in some liquid such as water and then rolled in dry bentonite. The bentonite adheres readily to the damp cotton, taking up the liquid and forming a skin or sheath 11 around the cotton wick. The wetting and rolling in dry bentonite may be continued until a block or sheath of appreciable size has been built up.

The end of the wick may be inserted in a reservoir 12 and will serve to lift the liquid 13 out of the reservoir and distribute it throughout the block or sheath of bentonite where it may not run, drip, dribble or return, but gradually be given off by evaporation to the air. This product may also be made by admixing cellulose in the form of wood fiber or other cellulosic material with the bentonite either in the dry or wet state. In this form the liquid is conducted through the wood fiber or similar material instead of on the surface so that the swelling action of the bentonite is not sufficient to choke off the flow of liquid to the interior of the body. The respective proportions of the bentonite and the cellulosic material may be varied widely; that is to say, the relative mass of bentonite used may be either greater or less or equal to the mass of the cellulosic material, depending largely upon the nature of the cellulosic substance and, also, upon the type of bentonite used; preferably, however, the amount of cellulosic material taken is greater than that of the bentonite.

In these various associations of bentonite and cellulosic material the liquid is distributed throughout the bentonite utilizing its full capacity for liquid, increasing the available storage capacity, and presenting a large surface area which serves to gradually give off the liquid by evaporation.

The subjecting of this product to some liquids will not cause dispersion of the bentonite. In these cases, it is necessary and desirable either to subject the product to a mixture of water and such liquid, or to disperse it in water before applying it to the other liquid. In the case of alcohol added to the water the rate of evaporation is increased.

The combination of these two materials need not take any particular arrangement as long as the two surfaces are presented to each other. For example, the bentonite can be used to form a core 14 as shown in Figure 5 and the cotton to form a sheath 15 surrounding the core; this arrangement is not as effective for cooperation between the two materials in raising liquid vertically, but it is more desirable for covering the sticky surface of the bentonite, thus facilitating handling. Other arrangements of the two materials can be made, such as flat plates, domes, tubes, and all form-fitting shapes.

As suggested above, the absorbent structure may also take the forms shown in Figures 1 and 2. In Figure 1 continuous cellulosic fibres 16 extend throughout the body of bentonite 17 to insure that the liquid will be thoroughly distributed to all portions of the absorbent material. In Figure 2 relatively short cellulosic fibres 18 are shown dispersed evenly through the body of absorbent material 19. As the liquid is absorbed into the material, the short fibres carry the liquid into the entire mass of the material, notwithstanding the swelling action above explained.

The combination of chamois and bentonite produces a somewhat and even more favorable result. However, it has the possible disadvantage that at the outset the chamois has an odor, but which gradually disappears. The chamois is possibly susceptible to disintegration.

The combination of other clays with cellulose also work to some extent but show a marked difference from bentonite. For instance, German Vallender, which is probably the fattest and heaviest clay outside of the clay-like material bentonite, will cling to the wick but will not give the skin effect of bentonite. Liquid does not stand as evenly distributed on it as on the surface of bentonite, the earthy odor peculiar to unprocessed clays is apparent, and the liquid did not exude evenly over its surface as was the case of the bentonite combination.

The finer clays such as china clays, paper clays, etc., exhibit these same properties to a lesser degree when combined with a cellulosic material.

Bentonite has a tremendous surface per unit volume of material due to its very finely divided state. For example, a cube an inch on the edge has a surface area of six square inches. Assuming that a cube one inch on edge is filled with normaly packed dry bentonite and contains fifty percent voids; each particle of bentonite having a mean diameter of 1 micron; such a cubic inch of bentonite would contain approximately 8,193 billion particles of bentonite. Further, assuming that each particle of bentonite exists in substantially cubic form, the total area of all these particles contained within the 1-inch cube would aggregate 76,195 square inches; or would amount to substantially 12,700 times the superficial area of the containing 1-inch cube.

The above may be considered illustrative of bentonite in general, whereas, in the case of the typical Wyoming bentonite it has been authoritatively estimated that 65% of the particles have a mean diameter of less than .2 micron. It is obvious that in the latter case the surface area would be five times greater than the enormous area indicated in the above example.

Since adsorption phenomena are directly related to surface, it may readily be seen how bentonite evidences such enormous adsorption effects.

It is equally true that various bentonites and other clay-like materials, such as kaolin, tripoli, fuller's earth, diatomaceous earth, finely divided siliceous substances, etc. possess relatively different adsorption values. For this reason I do not want to limit my invention solely to the use of the commonly known bentonites, but do include the afore-mentioned similar materials having high adsorption properties.

This product has extensive usefulness as a humidifier in air conditioning systems, a humidifier for large volumes of tobacco and other similar things, and an absorbing agent for deodorants and perfume for use in laboratories and washrooms. Perfumes and deodorants may best be distributed by dissolving them in water and permitting them to pass through the wick and bentonite, where they are exposed to the air and evaporation. This product has many other uses also.

Wherever in this application the words "absorb" or "absorbing" are used, it is intended to cover the broad definition of these words, including that of adsorbing and occluding and related phenomena (of interface attraction of molecules comprising the respective solids and fluids).

Having thus described my invention, I claim:

1. An absorbent structure including in combination a body of absorbing material of the order of clay that swells when in contact with a liquid to an extent which retards the spreading of the liquid throughout the body; and a liquid conductor means; said means including a member that will convey said liquid through its interior; said member extending from a portion of said body which may be swelled to another portion thereof and being so associated with said material as to disperse said liquid therethrough so that even though a portion of said material which may be in contact with said liquid swells to said extent, additional liquid may be distributed by said member to other portions of the body of said material whereby a more complete saturation of the body of absorbing material may be had.

2. An absorbent structure including in combination a body of absorbing material of the order of clay that swells when in contact with a liquid to an extent which retards the spreading of the liquid throughout the body; and a cellulosic liquid conductor means; said cellulosic means extending from a portion of said body which may be swelled to another portion thereof and being so associated with said material as to disperse said liquid therethrough so that even though a portion of said material which may be in contact with said liquid swells to said extent, additional liquid may be distributed by said means to other portions of the body of said material whereby a more complete saturation of the body of absorbing material may be had.

3. An absorbent structure including in combination a body of absorbing material of the order of clay that swells when in contact with a liquid to an extent which retards the spreading of the liquid throughout the body; and a plurality of continuous cellulosic liquid conductor means; said cellulosic means extending from a portion of said body which may be swelled to another portion thereof and being so associated with said material as to disperse said liquid therethrough so that even though a portion of said material which may be in contact with said liquid swells to said extent, additional liquid may be distributed by said means to other portions of the body of said material whereby a more complete saturation of the body of absorbing material may be had.

4. An absorbent structure including in combination a body of absorbing material of the order of clay that swells when in contact with a liquid to an extent which retards the spreading of the liquid throughout the body; and a plurality of short cellulosic liquid conductor means uniformly distributed throughout said material; said cellulosic means extending from a portion of said body which may be swelled to another portion thereof and being so associated with said material as to disperse said liquid therethrough so that even though a portion of said material which may be in contact with said liquid swells to said extent, additional liquid may be distributed by said means to other portions of the body of said material whereby a more complete saturation of the body of absorbing material may be had.

5. An absorbent structure including in combination a body of absorbing material of the order of clay that swells when in contact with a liquid to an extent which retards the spreading of the liquid throughout the body; and a centrally disposed cellulosic liquid conductor means; said cellulosic means extending from a portion of said body which may be swelled to another portion thereof and being so associated with said material as to disperse said liquid therethrough so that even though a portion of said material which may be in contact with said liquid swells to said extent, additional liquid may be distributed by said means to other portions of the body of said material whereby a more complete saturation of the body of absorbing material may be had.

6. An absorbent structure including in combination a body of absorbing material of the order of clay that swells when in contact with a liquid to an extent which retards the spreading of the liquid throughout the body; and a cellulosic liquid conductor means; said means surrounding said material and extending from a portion of said body which may be swelled to another portion thereof and being so associated with said material as to disperse said liquid therethrough so that even though a portion of said material which may be in contact with said liquid swells to said extent, additional liquid may be distributed by said means to other portions of the body of said material whereby a more complete saturation of the body of absorbing material may be had.

JOSHUA B. WARNER.